(12) United States Patent
Medina et al.

(10) Patent No.: US 8,449,948 B2
(45) Date of Patent: May 28, 2013

(54) METHOD AND SYSTEM FOR CORROSION PROTECTION OF LAYERS IN A STRUCTURE OF A MAGNETIC RECORDING TRANSDUCER

(75) Inventors: Jose Antonio Medina, Pleasanton, CA (US); Keith Y. Sasaki, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 658 days.

(21) Appl. No.: 12/557,442

(22) Filed: Sep. 10, 2009

(65) Prior Publication Data

US 2011/0056839 A1    Mar. 10, 2011

(51) Int. Cl.
  B05D 1/36    (2006.01)
  B05D 5/12    (2006.01)
  C25D 5/18    (2006.01)
  C25D 5/10    (2006.01)
  C25D 5/12    (2006.01)
  C23C 28/02   (2006.01)

(52) U.S. Cl.
  USPC ........... 427/402; 427/131; 427/132; 427/404; 205/86; 205/102; 205/103; 205/104; 205/170; 205/181; 205/192

(58) Field of Classification Search
  USPC ............... 205/102, 103, 104, 170, 181, 192, 205/86; 427/402, 404, 131, 132
  See application file for complete search history.

(56) References Cited

U.S. PATENT DOCUMENTS

| | | | |
|---|---|---|---|
| 2,848,391 A | 8/1958 | Fahnoe et al. | |
| 3,563,864 A | 2/1971 | Du Rose et al. | |
| 3,909,209 A | 9/1975 | Kruper et al. | |
| 4,193,789 A | 3/1980 | Entwistle | |
| 4,384,929 A | 5/1983 | Tremmel et al. | |
| 4,430,171 A | 2/1984 | Lemke et al. | |
| 5,057,380 A | 10/1991 | Hayashi et al. | |
| 5,489,488 A | 2/1996 | Asai et al. | |
| 5,582,927 A | 12/1996 | Andricacos et al. | |
| 5,606,478 A | 2/1997 | Chen et al. | |
| 5,783,313 A | 7/1998 | Moysan, III et al. | |
| 5,792,547 A | 8/1998 | Liu et al. | |
| 5,812,350 A | 9/1998 | Chen et al. | |
| 5,896,252 A | 4/1999 | Kanai | |

(Continued)

OTHER PUBLICATIONS

Su et al., "Ni1-xFex (0.1<x<0.75) Alloy Foils Prepared From a Fluorborate Bath Using Electrochemical Deposition", J. of Alloys and Compounds (no month, 2009), vol. 474, pp. 190-194.*

(Continued)

*Primary Examiner* — Edna Wong

(57) ABSTRACT

A method for providing a structure in a magnetic recording transducer is described. The method includes plating a first layer in a plating bath using a first plurality of plating conditions. The first layer has a first galvanic potential. The method also includes modifying the plating bath and/or the first plurality of plating conditions to provide a modified plating bath and/or a second plurality of plating conditions. The method further includes plating a second layer using the modified plating bath and/or the second plurality of plating conditions. The second layer has a second galvanic potential. The first galvanic potential is between the second galvanic potential and a third galvanic potential of a third layer if the third layer adjoins the first layer. The second galvanic potential is between the first galvanic potential and the third galvanic potential of the third layer if the third layer adjoins the second layer.

3 Claims, 5 Drawing Sheets

U.S. PATENT DOCUMENTS

| | | | |
|---|---|---|---|
| 5,930,085 | A | 7/1999 | Kitade et al. |
| 5,961,746 | A | 10/1999 | Nepela |
| 6,172,859 | B1 | 1/2001 | Watanabe et al. |
| 6,381,095 | B1 | 4/2002 | Sin et al. |
| 6,391,181 | B1 | 5/2002 | Gorodetski et al. |
| 6,466,416 | B1 | 10/2002 | Honjo et al. |
| 6,490,131 | B2 | 12/2002 | Sano et al. |
| 6,714,380 | B2 | 3/2004 | Kawasaki et al. |
| 6,721,142 | B1 | 4/2004 | Meyer et al. |
| 6,723,449 | B2 | 4/2004 | Kudo et al. |
| 6,801,392 | B2 | 10/2004 | Kawasaki et al. |
| 6,898,054 | B2 | 5/2005 | Kawasaki et al. |
| 6,912,771 | B2 | 7/2005 | Dinan et al. |
| 6,930,863 | B2 | 8/2005 | Biskeborn |
| 7,179,360 | B2 | 2/2007 | Kawasaki et al. |
| 7,288,333 | B2 | 10/2007 | Kawasaki et al. |
| 7,292,415 | B2 | 11/2007 | Noma |
| 7,325,296 | B2 | 2/2008 | Biskeborn |
| 7,333,295 | B1 | 2/2008 | Medina et al. |
| 7,444,740 | B1 | 11/2008 | Chung et al. |
| 7,485,378 | B2 | 2/2009 | Oikawa et al. |
| 2002/0106533 | A1 | 8/2002 | Kudo et al. |
| 2003/0002227 | A1 | 1/2003 | Jarratt |
| 2003/0002228 | A1 | 1/2003 | Suwabe et al. |
| 2003/0048582 | A1 | 3/2003 | Kanada et al. |
| 2004/0027715 | A1 | 2/2004 | Hixson-Goldsmith et al. |
| 2004/0169959 | A1 | 9/2004 | Kudo et al. |
| 2006/0096081 | A1 | 5/2006 | Bonhote et al. |
| 2007/0285835 | A1 | 12/2007 | Sun et al. |
| 2008/0166584 | A1* | 7/2008 | Deligianni et al. ........... 428/611 |

OTHER PUBLICATIONS

Leisner et al., "Methods for Electrodepositing Composition-Modulated Alloys", J. of Materials Processing Technology (no month, 1996), vol. 58, pp. 39-44.*

Kurlyandskaya et al., "Longitudinal Magnetic Bistability of Electroplated Wires", J. of Magnetism and Magnetic Materials (no month, 2002), vol. 249, pp. 34-38.*

Osaka, et al., "New Soft Magnetic CoNiFe Plated Films with High Bs =2.0-2.1 T", IEEE Transactions on Magnetics, vol. 34, No. 4, Jul. 1998, pp. 1432-1434.

K. Ohashi, et al., "Newly Developed Inductive Write Head with Electroplated CoNife Film", IEEE Transactions on Magnetics, vol. 34, No. 4, Jul. 1998, pp. 1462-1464.

Hyun, et al., "Soft Magnetic Properties of Permalloy Multilayered Films with Ceramic Intermediate Layers", IEEE Transactions on Magnetics, vol. 31, No. 6, Nov. 1995, pp. 4100-4102.

Jin-Woo Park, et al., "A Sacrificial Layer Approach to Highly Laminated Magnetic Cores", School of Electrical and Computer Engineering Georgia Institute of Technology, IEEE 2002, pp. 380-383.

Jun Zhu, et al., "Modeling of Lamination Effects for Thin-Film Inductive Heads", IEEE Transactions on Magnetics, vol. 32, No. 5, Sep. 1996, pp. 3533-3535.

* cited by examiner

METHOD AND SYSTEM FOR CORROSION PROTECTION OF LAYERS IN A STRUCTURE OF A MAGNETIC RECORDING TRANSDUCER

BACKGROUND

High moment materials are used in various layers in electronic devices. For example, magnetic recording head structures, such as write transducer poles and shields, may include conventional multilayers. The conventional layers in the multilayers may be formed by some combination of sputtering and/or plating. At least some of these layers may include high $B_{sat}$ materials, such as high-Fe content alloys. Such materials often have a galvanic potential that is highly polarized in the negative direction and are thus subject to corrosion. These alloys may also be in contact with more noble materials. For example, a higher-Fe content Fe alloy having a more negative galvanic potential may be in contact with a lower-Fe content alloy having a less negative galvanic potential. Because of the galvanic coupling between these materials, the higher-Fe content alloy may be particularly susceptible to corrosion.

Various conventional mechanisms exist for reducing corrosion of such high moment layers in a device. For plating processes time limitations are typically set for loading and unloading/time before rinse of a substrate to limit exposure of the material to an environment in which the material(s) may corrode. However, corrosion may still occur. If the material is plated, conventional "hot loading" and "hot unloading" may be used. In conventional hot loading/unloading, a protective cathodic current passes through the deposition substrate as the substrate is loaded into/unloaded from the plating cell. However, this conventional method is only effective as long as the cathodic current is passing through the device. Further, this conventional method may be less effective during the unloading. Once removal of the substrate from the plating cell causes the circuit to break, protection due to the cathodic current is lost. Exposure to corrosion then intrinsically exists because the unprotected substrate remains in contact with acidic plating solution until rinse. The risk of corrosion is higher for plating operations where plating-to-rinse transfer times are greater. However, this risk can still be significant for lower transfer times achievable in automated plating tools. Consequently, materials in a device such as a magnetic recording transducer are subject to corrosion.

Accordingly, what is needed is a system and method for providing a transducer that may mitigate corrosion of high moment layers.

BRIEF SUMMARY OF THE INVENTION

A method for providing a structure in a magnetic recording transducer is described. The method includes plating a first layer in a plating bath using a first plurality of plating conditions. The first layer has a first galvanic potential. The method also includes modifying the plating bath and/or the first plurality of plating conditions to provide a modified plating bath and/or a second plurality of plating conditions. The method further includes plating a second layer using the modified plating bath and/or the second plurality of plating conditions. The second layer has a second galvanic potential. The first galvanic potential is between the second galvanic potential and a third galvanic potential of a third layer if the third layer is adjacent to the first layer. The second galvanic potential is between the first galvanic potential and the third galvanic potential of the third layer if the third layer is adjacent to the second layer.

DETAILED DESCRIPTION OF THE PREFERRED EMBODIMENTS

Figure 1:
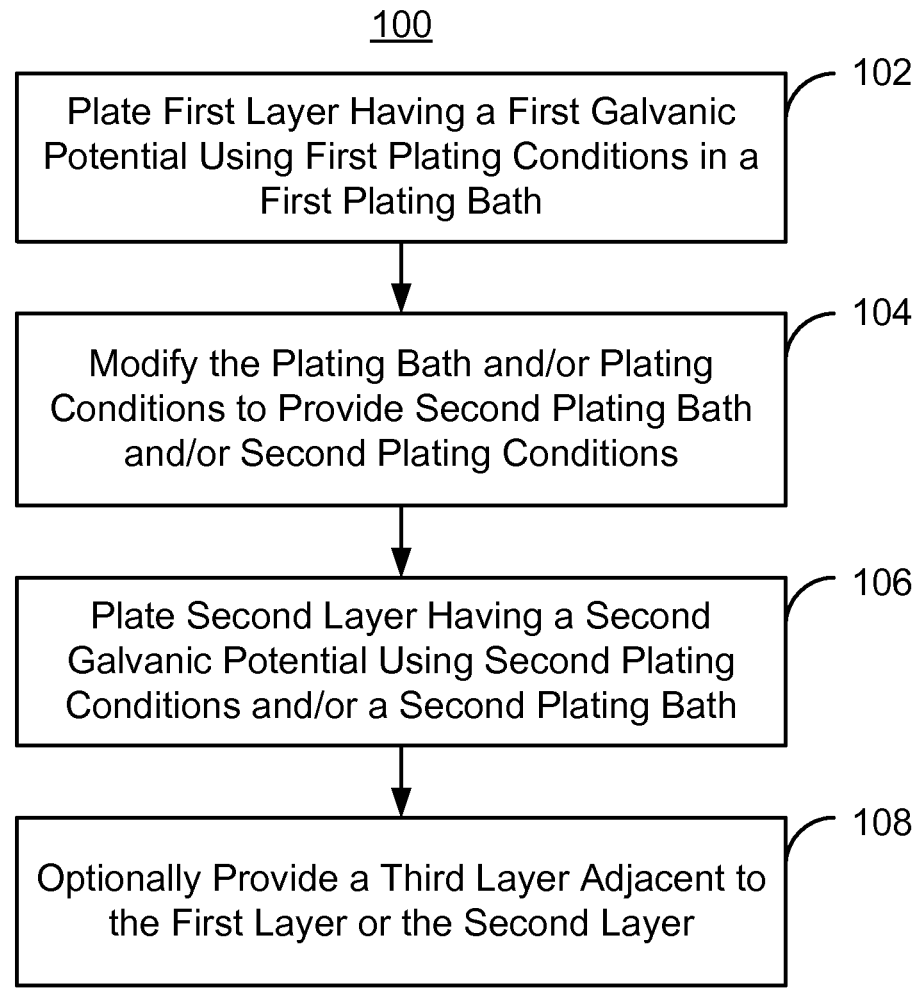
FIG. 1 is a flow chart depicting an exemplary embodiment of a method for providing a structure in a magnetic recording transducer.

FIG. 1 depicts an exemplary embodiment of a method 100 for providing a structure in a magnetic recording transducer. For simplicity, some steps may be omitted. The method 100 also may commence after formation of other structures of the read and/or write transducer. The method 100 is also described in the context of providing a single structure. However, the method 100 may be used to fabricate multiple structures at substantially the same time. The method 100 is also described in the context of particular layers. However, in some embodiments, such layers may include sub-layer(s).

A first layer is plated, via step 102. Step 102 utilizes a plating bath, or electrolyte solution, in a plating cell. The plating bath may include various constituents, including additives and other components of the first layer being plated. The plating in step 102 is also carried out using a first plurality of plating conditions. These plating conditions may include the plating or cathodic current, the electrolyte agitation rate near the plating substrate, the flow rate and temperature of the plating bath. The first layer has a first galvanic potential that is based on the materials plated in step 102.

At least one of the plating bath and the first plurality of plating conditions are modified, via step 104. For example, the plating current may be adjusted in step 104. In some embodiments, the plating current may be increased or decreased in a step modulation, in a linear fashion, or in another manner. The electrolyte agitation may also be modified in step 104, for example by changing the rate at which paddles mix the plating bath. The temperature, concentration of constituents of the plating bath, flow rate, and/or other features of the plating bath and/or plating conditions may be modified in step 104. However, these modifications may be made without requiring removal of the device from the plating bath. Thus, at least one of a modified plating bath and a second plurality of plating conditions may thus be provided without removing from the plating bath the substrate on which first layer was plated.

A second layer is plated, via step 106. The second layer is plated using at least one of the modified plating bath and the second plurality of plating conditions. Step 106 is also carried out without removing the device being fabricated from the plating bath. Thus, steps 102 and 106 may be performed in the same plating cell. The second layer has a second galvanic potential that is determined by the composition of the second layer. The second layer has a different composition than the first layer. The second galvanic potential is, therefore, different from the first galvanic potential.

The first and second galvanic potentials are determined based on the galvanic potential and location of a third layer. The third layer may be adjacent to the first layer or the second layer. In some such embodiments, the third layer adjoins the first layer or the second layer. In some embodiments, the third layer may not be part of the transducer. For example, the third layer may be an environment that adjoins the first or second layers. In such an embodiment, the third layer may be considered to be a layer of gas, liquid, or other ambient. In other embodiments, the third layer may be part of the device. In such embodiments, the third layer may optionally be provided before the first layer or after the second layer, via step 108. Thus, either the first layer or the second layer would be adjacent to the third layer. Step 108 may include sputtering, plating, using other deposition techniques, or otherwise providing the third layer.

Whether or not the third layer is part of the transducer, the first galvanic potential is between the second galvanic potential and a third galvanic potential of the third layer if the first layer is between the second and third layers. In one such embodiment, the first galvanic potential may be less negative than the second galvanic potential and more negative than the third galvanic potential. Alternatively, the first galvanic potential may be more negative than the second galvanic potential and less negative than the third galvanic potential. Consequently, the first layer acts as a buffer layer between the second and third layers. Similarly, the second galvanic potential is between the first galvanic potential and the third galvanic potential of the third layer if the second layer is between the first and third layers. In such an embodiment, the second galvanic potential may be less negative than the first galvanic potential and more negative than the third galvanic potential. Alternatively, the second galvanic potential may be less negative than the third galvanic potential and more negative than the first galvanic potential. Thus, the second layer acts as a buffer layer between the first and third layers. Thus, a buffer layer having an intermediate galvanic potential is provided between a more noble layer having a more positive galvanic potential and a more likely to corrode layer having a more negative galvanic potential corrode. As a result, the galvanic coupling that would otherwise exist between the more noble layer (less negative galvanic potential) and the more likely to corrode layer (more negative galvanic potential) is broken. Stated differently, the buffer layer may eliminate the highly polarized interfacial potentials between the more noble layer and the more likely to corrode layer. In magnetic transducers including structures having high saturation magnetization, a buffer layer may be provided between the more likely to corrode high $B_{sat}$ high Fe layers and more noble alloys. The newly created interfaces between the buffer and adjacent layers enable a more gradual galvanic potential transition. The risk of localized galvanic corrosion may thus be reduced. This reduction may be particularly advantageous when side or transverse sections of the stack of layers is exposed to oxidizing environments which can happen at the substrate level, for example in post resist-strip operations, or at slider fabrication level operations, such as the air-bearing surface definition. Further, the first layer or second layer, when acting as a buffer layer, provides a physical barrier between the more noble layer and the more likely to corrode layer. Consequently, the likelihood of corrosion may be reduced. Further, this protection may be provided in steps 102-106 without removing the device from the plating bath(s) used. The buffer layer may thus be provided without loss of galvanic protection provided by the plating cell. Thus, fabrication of layers that are more likely to corrode, particularly high $B_{sat}$, high Fe content layers, may be facilitated. Consequently, performance and/or reliability of a transducer may be improved.

Figure 2:
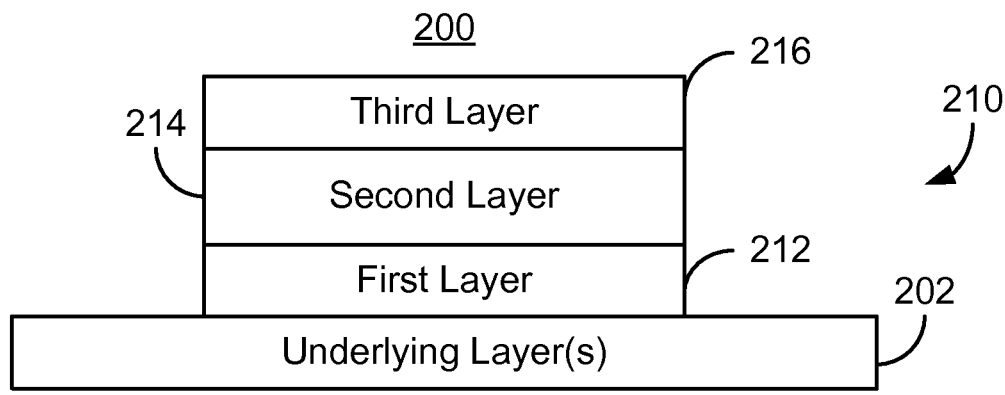
FIG. 2 depicts an exemplary embodiment of a portion of a transducer including an exemplary embodiment of a magnetic structure.

FIG. 2 depicts an exemplary embodiment of a portion of a transducer 200 including an exemplary embodiment of a magnetic structure 210. For clarity, FIG. 2 is not drawn to scale. The transducer 200 may be fabricated using the method 100. The transducer 200 may be part of a magnetic head, which resides on a slider and is part of a disk drive. The transducer 200 includes underlying layer(s) 202 and the magnetic structure 210. The underlying layer(s) 202 are simply those portions of the magnetic transducer 200 below the structure 210. The magnetic structure 210 includes a first layer 212 and a second layer 214. The third layer 216 is shown as part of the structure 210 and adjoining the second layer 214. However, in an alternate embodiment, the third layer 216 may be part of another structure in the transducer 200. In another embodiment, the third layer 216 is not part of the transducer. For example, the third layer 216 might be a layer of gas, a layer of the plating bath in which the structure 210 is formed, a layer of an ambient in which the transducer 200 resides, or other material(s). Note that the widths and thicknesses of the layers 202, 212, and 214 are for exemplary purposes only. The first layer 212 is provided using step 102 of the method 100. The second layer 216 is provided in step 106 of the method 108. Because the second layer 214 is between the first layer 212 and the third layer 216, the second layer 214 has a galvanic potential that is between that of the first layer 212 and the third layer 216. Stated differently, the galvanic potential of the second layer 214 may be less negative than that of the first layer 212, but more negative than that of the third layer 216. Alternatively, the galvanic potential of the second layer 214 may be more negative than that of the first layer 212, but less negative than that of the third layer 216. Moreover, the second layer 214 provides a physical barrier between the first layer 212 and the third layer 216.

For example, as discussed above, the third layer may be a layer of gas or other portion of the environment to which the structure 210 is exposed. In one such embodiment, the first layer 212 is a $Ni_{1-x}Fe_x$ layer where x is at least 0.5 and not more than 0.95. The second layer 214 might be a $Ni_{1-y}Fe_y$ layer, where y is at least 0.18 and not more than 0.75. In addition, y is less than x. In one such embodiment, the first layer 212 includes $Ni_{20}Fe_{80}$, while the second layer includes $Ni_{35}Fe_{65}$. Similarly, in another such embodiment, the first layer 212 is a $Co_{1-x}Fe_x$ layer, where x is at least 0.45 and not more than 0.8. The second layer 214 is a $Co_{1-y}Fe_y$ layer, where y is at least 0.1, not more than 0.5, and less than x. In one such embodiment, the first layer 212 includes $Co_{40}Fe_{60}$, while the second layer includes $Co_{65}Fe_{35}$. In another such embodiment, the first layer 212 is a $Co_{1-w-x}Ni_wFe_x$ layer where w is at least 0.01 and not more than 0.08 and x is at least 0.45 and not more than 0.75. The second layer 214 is a $Co_{1-y-z}Ni_yFe_z$ layer, where y is at least 0.02 and not more than 0.15 and z is at least 0.2 and not more than 0.5. In addition, w is less than y and x is greater than z. In one such embodiment, the first layer 212 includes $Co_{36}Ni_{3.5}Fe_{60.5}$, while the second layer includes $Co_{57}Ni_8Fe_{35}$. Thus, in each embodiment, the second layer 214 has a lower Fe content and a lower moment than the first layer 212. The galvanic potential of the second layer 214 is also less negative than that of the first layer 212. However, the third layer 216 is some other material. Thus, the galvanic potential of the second layer 214 may be considered to be greater than that of the third layer 216. In addition, in the case where the third layer 216 is an ambient, the second layer 214 may also physically isolate the first layer 212 from the ambient. Thus, the first layer 212 may be protected from the corrosive environment.

In other embodiments, the third layer 216 may be part of the transducer 200 and/or provided during fabrication. The third layer 216 may also adjoin the second layer 214. For example, the third layer may include a $Ni_{1-x}Fe_x$ layer, where x is at least 0.5 and not more than 0.95. The second layer 214 includes a $Ni_{1-y}Fe_y$ layer, where y is at least 0.45, not more than 0.75, and less than x. The first layer 212 includes a $Ni_{1-z}Fe_z$ layer, where z is at least 0.18, not more than 0.55 and less than y. In one such embodiment, the first layer 212 includes $Ni_{55}Fe_{45}$, the second layer includes $Ni_{35-40}Fe_{60-65}$, and the third layer includes $Ni_{29}Fe_{71}$. In such an embodiment, the Fe content and galvanic potential of the second layer 214 is between the Fe contents and galvanic potentials of the first layer 212 and the third layer 216.

Thus, the second layer 214 may act as a buffer layer between the first layer 212 and the third layer 216, breaking the galvanic coupling between the first layer 212 and the third layer 216. Instead, a more gradual transition in galvanic potential is achieved between the first layer 212 and the second layer 214 and between the second layer 214 and the third layer 216. Thus, galvanic corrosion may be reduced. The second layer 214 also provides a physical barrier between the first layer 212 and the third layer 216. Further, the first layer 212 and second layer 214 may be fabricated by changing the plating bath or plating conditions, without removing the transducer 200 from contact with the plating bath. Consequently, the layers 212 and 214 also remain protected during formation. Thus, fabrication of layers that are more likely to corrode, particularly high $B_{sat}$ layers, may be facilitated.

Figure 3:
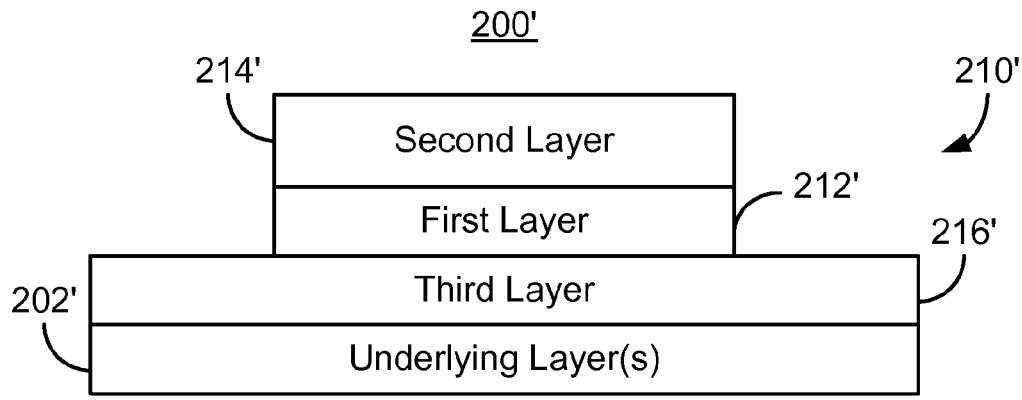
FIG. 3 depicts another exemplary embodiment of a portion of a transducer including an exemplary embodiment of a magnetic structure.

Conversely, FIG. 3 depicts another exemplary embodiment of a portion of a transducer 200' including an exemplary embodiment of a magnetic structure 210'. For clarity, FIG. 3 is not drawn to scale. The transducer 200' and magnetic structure 210' are analogous to the transducer 200 and magnetic structure 210 shown in FIG. 2. Consequently, analogous components are similarly labeled. The transducer 200' thus includes underlying layer(s) 202' and the magnetic structure 210'. The underlying layer(s) 202' are simply those portions of the magnetic transducer 200' below the structure 210'. The magnetic structure 210' includes a first layer 212' and a second layer 214'. The third layer 216' is shown as part of the structure 210'. However, in an alternate embodiment, the third layer 216' may be part of another structure in the transducer 200'. Note that the widths and thicknesses of the layers 202', 212', and 214' are for exemplary purposes only. The first layer 212' is provided using step 102 of the method 100. The second layer 216' is provided in step 106 of the method 108. Because the first layer 212' is between the second layer 214' and the third layer 216', the first layer 212' has a galvanic potential that is between that of the second layer 214' and the third layer 216'. Stated differently, the galvanic potential of the first layer 212' is less negative than that of the second layer 214', but more negative than that of the third layer 216'. Alternatively, the galvanic potential of the first layer 212' is more negative than that of the second layer 214', but less negative than that of the third layer 216'. For example, in one embodiment, the second layer includes a $Ni_{1-w}Fe_w$, where w is at least 0.45 and not more than 0.7. The first layer includes a $Ni_{1-x}Fe_x$ layer, where and x is at least 0.5 and not more than 0.8. In addition, w is less than x. In such an embodiment, the third layer includes $Co_{1-y-z}Ni_yFe_z$, where y is at least 0.01 and not more than 0.08, and z is at least 0.45 and not more than 0.75. In one such embodiment, the second layer 214' includes $Ni_{49}Fe_{51}$, the first layer 212' includes $Ni_{40-45}Fe_{55-60}$, and the third layer 216' includes $Co_{36}Ni_{3.5}Fe_{60.5}$.

Thus, the first layer 212' may act as a buffer layer between the second layer 214' and the third layer 216', breaking the galvanic coupling between the second layer 214' and the third layer 216'. Instead, a more gradual transition in galvanic potential is achieved between the first layer 212' and the second layer 214' and between the first layer 212' and the third layer 216'. Thus, galvanic corrosion may be reduced. Further, the first layer 212' and second layer 214' may be fabricated by changing the plating bath or plating conditions, without removing the transducer 200 from contact with the plating bath. Consequently, the layers 212' and 214' also remain protected during formation. Thus, fabrication of layers that are more likely to corrode, particularly high $B_{sat}$ layers, may be facilitated.

Figure 4:
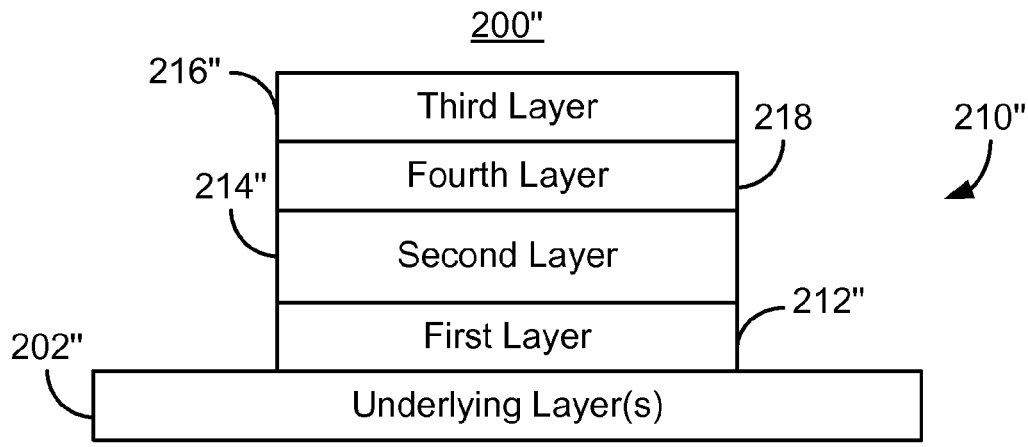
FIG. 4 depicts another exemplary embodiment of a portion of a transducer including an exemplary embodiment of a magnetic structure.

FIG. 4 depicts another exemplary embodiment of a portion of a transducer 200" including an exemplary embodiment of a magnetic structure 210". For clarity, FIG. 4 is not drawn to scale. The transducer 200" and magnetic structure 210" are analogous to the transducers 200/200' and magnetic structures 210/210' shown in FIGS. 2-3. Consequently, analogous components are similarly labeled. The transducer 220" includes underlying layer(s) 202" and the magnetic structure 210". The underlying layer(s) 202" are simply those portions of the magnetic transducer 200" below the structure 210". The magnetic structure 210" includes a first layer 212", and a second layer 214". The third layer 216" is shown as part of the structure 210". However, in an alternate embodiment, the third layer 216" may be part of another structure in the transducer 200". In an alternate embodiment, the third layer 216" may not be part of the transducer 200". For example, the third layer 216" might be a layer of gas, a layer of the plating bath in which the structure 210" is formed, a layer of other ambient or other material(s). Note that the widths and thicknesses of the layers 202", 212", and 214" are for exemplary purposes only. The first layer 212" is provided using step 102 of the method 100. The second layer 214" is provided in step 106 of the method 108. The second layer 214" resides between the first layer 212" and the third layer 216".

The transducer 200" also includes a fourth layer 218. The fourth layer 218 resides between the second layer 214" and the third layer 216". The fourth layer 218 may be provided in an analogous manner to the second layer 214". More specifically, the fourth layer 218 has a galvanic potential between that of the second layer 214" and the third layer 216". Note that it is not required that the galvanic potential of the fourth layer 218 be mid-way between the second and third galvanic potentials. The galvanic potentials either increase monotonically or decrease between the layers 212", 214", 218 and 216". Thus, the galvanic coupling between the first layer 212" and third layer 216" is further divided by the fourth layer 218.

Further, the fourth layer 218 may be provided by making additional changes to the second plating bath and/or the second plating conditions, then plating the fourth layer 218. Thus, the fourth layer 218 is provided while maintaining the protection afforded by the plating bath. Additional layers (not shown) may be provided between the first layer 212" and third layer 216" as long as the galvanic coupling either increases monotonically or decreases monotonically between the first layer 212" and the third layer 216". The additional layers (not shown) may also be plated without removing the device from the plating bath, just modifying the bath and/or plating conditions. Consequently, corrosion of the magnetic structure 210" may be reduced. Thus, fabrication of layers that are more likely to corrode, particularly high $B_{sat}$ layers, may be facilitated.

Figure 5:
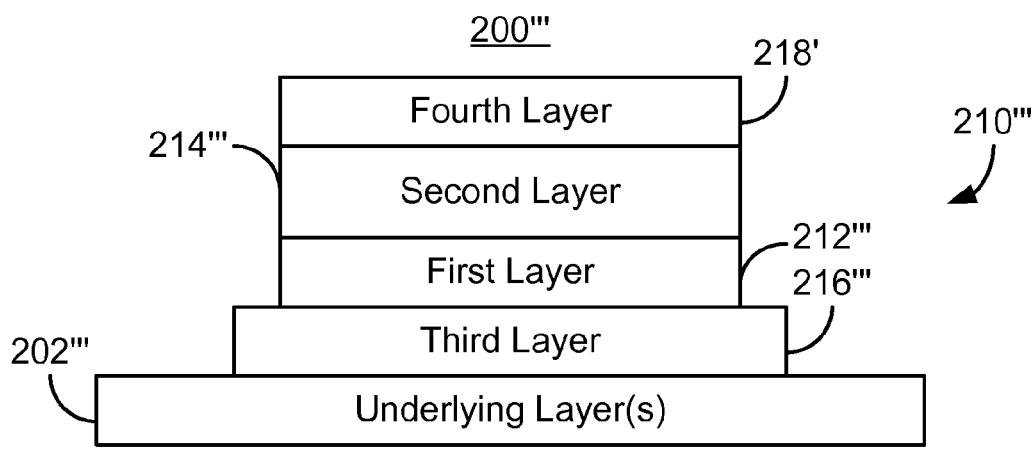
FIG. 5 depicts another exemplary embodiment of a portion of a transducer including an exemplary embodiment of a magnetic structure.

FIG. 5 depicts another exemplary embodiment of a portion of a transducer 200''' including an exemplary embodiment of a magnetic structure 210'''. For clarity, FIG. 5 is not drawn to scale. The transducer 200''' and magnetic structure 210''' are analogous to the transducers 200/200'/200" and magnetic structures 210/210'/210" shown in FIGS. 2-4. Consequently, analogous components are similarly labeled. The transducer 200''' includes underlying layer(s) 202''' and the magnetic structure 210'''. The magnetic structure 210''' thus includes a first layer 212''', a second layer 214''', a third layer 216''', and fourth layer 218'.

The second layer 214''' resides between the first layer 212''' and the fourth layer 218'. The fourth layer 218' may be provided in an analogous manner to the second layer 214'''. More specifically, the second layer 214''' has a second galvanic potential between the first galvanic potential of the first layer 212''' and the fourth galvanic potential of the fourth layer 218'. Note that it is not required that the galvanic potential of the second layer 214''' be mid-way between the first and fourth galvanic potentials. The galvanic potentials either increase monotonically or decrease between the layers 216''', 212''', 214''', and 218'. The fourth layer 218' may also be provided by making additional changes in the plating bath and/or plating conditions, then plating the fourth layer 218'. Thus, the fourth layer 218' is provided while maintaining the protection afforded by the plating bath. Additional layers (not shown) may be provided as long as the galvanic coupling either increases monotonically or decreases monotonically between the first layer 212''' and the third layer 216'''. Consequently, corrosion of the magnetic structure 210''' may be reduced. Thus, fabrication of layers that are more likely to corrode, particularly high $B_{sat}$ layers, may be facilitated.

Figure 6:
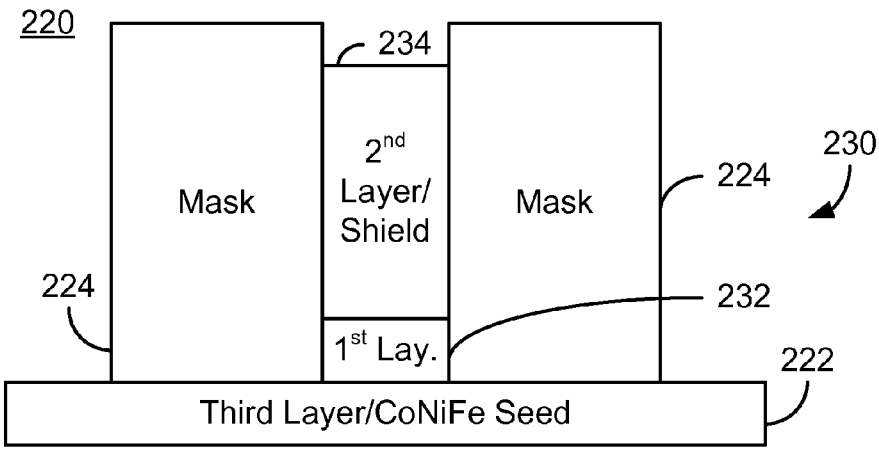
FIG. 6 depicts another exemplary embodiment of a portion of a transducer including an exemplary embodiment of a magnetic structure.

FIG. 6 depicts another exemplary embodiment of a portion of a transducer 220 including an exemplary embodiment of a magnetic structure 230. For clarity, FIG. 6 is not drawn to scale. The transducer 220 may be part of a magnetic head, which resides on a slider and is part of a disk drive. Further, only certain portions of the transducer 220 are shown. The transducer includes a first layer 232, a second layer 234, and a third layer 222. The first layer 232 resides between the second layer 234 and third layer 222. Thus, the layers 222, 232, and 234 correspond to the layers 216', 212', and 214', respectively.

In the embodiment shown, the third layer is the CoNiFe seed layer 222. The CoNiFe seed layer 222 may have a high saturation magnetization, for example on the order of 2.3T. The first layer 232 and second layer 234 are part of the magnetic structure 230. The first layer 232 is plated in the aperture of a mask 224, for example in step 102 of the method 100. In the embodiment shown, the first layer 232 is $Ni_{40-55}Fe_{60-55}$ and is plated on the CoNiFe seed layer 222. After plating of the first layer 232, the plating bath and/or plating conditions are modified, for example using step 104 of the method 100. The plating current may be decreased in a step-wise manner from a first current to a second current. The second layer 234 is then plated using the lower, second current, for example using step 106 of the method 100. In the embodiment shown, the second layer 234 is a shield layer and includes $Ni_{49}Fe_{51}$. Plating of the first layer 232 and of the second layer 234 may thus be performed in the same NiFe plating chemistry during the same plating run by introducing a single current step modulation. In addition, the first layer 232 has a more negative galvanic potential than the second (shield) layer 234, but a less negative galvanic potential than the seed layer 222. As a result, the risk of galvanic corrosion to the seed layer 222 during fabrication of the transducer 220 may be reduced. The composition and thickness of the first layer 232 may also selected be selected to reduce or minimize the changes in the performance of the transducer 220 due to the presence of the first layer 232.

Figure 7:
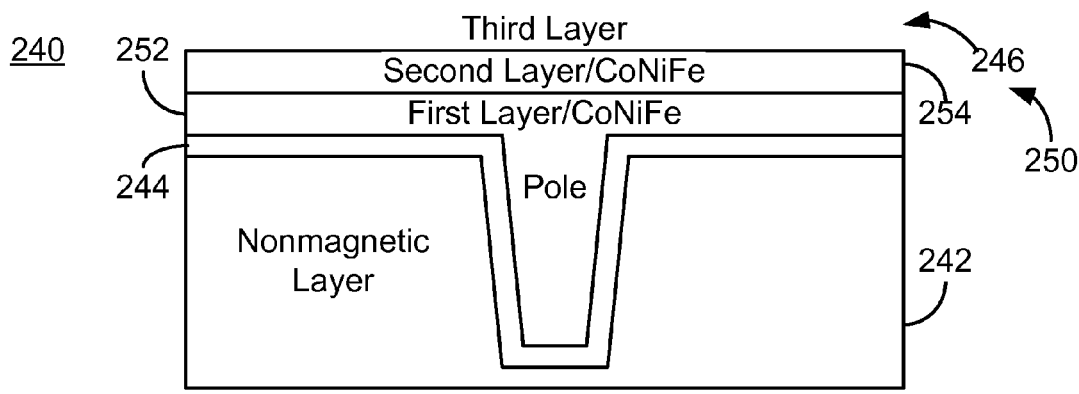
FIG. 7 depicts another exemplary embodiment of a portion of a transducer including an exemplary embodiment of a magnetic structure.

FIG. 7 depicts another exemplary embodiment of a portion of a transducer 240 including an exemplary embodiment of a magnetic structure 250. For clarity, FIG. 7 is not drawn to scale. The transducer 240 may be part of a magnetic head, which resides on a slider and is part of a disk drive. Further, only certain portions of the transducer 240 are shown. The transducer includes a first layer 252, a second layer 254, and a third layer 246. Also shown are underlying nonmagnetic layer 242 and seed layer 244. The second layer 254 resides between the first layer 252 and third layer 246. In the embodiment shown, the third layer is not part of the transducer 240. Instead, the third layer is some ambient to which the transducer 240 may be exposed. Thus, the layers 252, 254, and 246 correspond to the layers 212, 214, and 216, respectively.

In the embodiment shown, the third layer 246 is the plating or other environment to which the first layer 252 would otherwise be exposed. The first layer, the $Co_{36}Ni_{3.5}Fe_{60.5}$ pole layer 252 may have a high saturation magnetization, for example on the order of 2.3T. The second layer 254 may include $Co_{57}Ni_8Fe_{35}$, which has a less negative galvanic potential and is thus more corrosion resistant than the first layer 252. The first layer 252 is plated in the trench formed in the nonmagnetic material 242, for example in step 102 of the method 100. After plating of the first layer 252, the plating bath and/or plating conditions are modified, for example using step 104 of the method 100. In some embodiments, the plating current may be decreased in a step-wise manner from a first current to a second current. The second layer 254 is then plated using the lower, second current, for example using step 106 of the method 100. Plating of the first layer 252 and of the second layer 254 may thus be performed in the same plating chemistry during the same plating run by introducing a single current step modulation. In addition, the second layer 254 has a less negative galvanic potential than the first, pole layer 252. The second layer 254 may also act as a capping layer, isolating the first layer 252 from the third layer 246. As a result, the risk of galvanic or other types of corrosion to the pole layer 252 during fabrication of the transducer 250 may be reduced. Moreover, the high $B_{sat}$ first layer 252 may be shielded from the corrosive plating environment before unloading, rinse, drying, and/or other steps.

Figure 8:
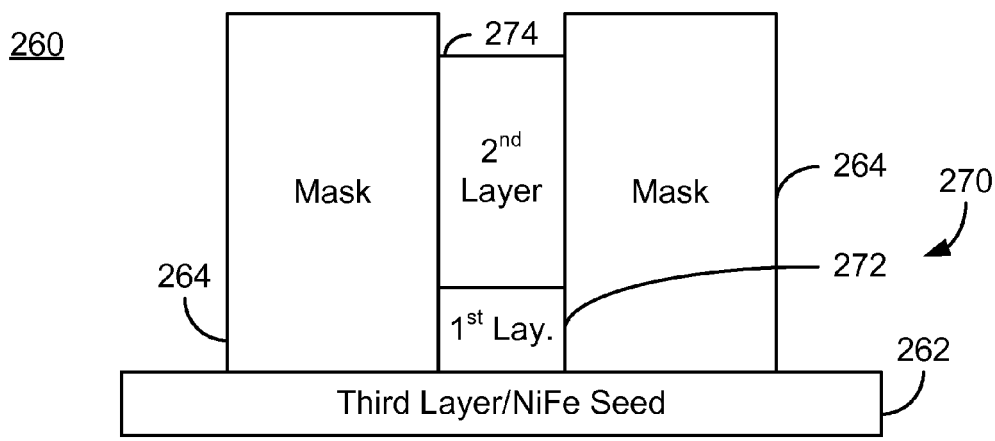
FIG. 8 depicts another exemplary embodiment of a portion of a transducer including an exemplary embodiment of a magnetic structure.

FIG. 8 depicts another exemplary embodiment of a portion of a transducer 260 including an exemplary embodiment of a magnetic structure 270. For clarity, FIG. 6 is not drawn to scale. The transducer 260 may be part of a magnetic head, which resides on a slider and is part of a disk drive. Further, only certain portions of the transducer 260 are shown. The transducer includes a first layer 272, a second layer 274, and a third layer 262. The first layer 272 resides between the second layer 274 and third layer 262. Thus, the layers 262, 272, and 274 correspond to the layers 216', 212', and 214', respectively.

In the embodiment shown, the third layer is a $Ni_{55}Fe_{45}$ seed layer 262. The first layer 272 and second layer 274 are part of the magnetic structure 270. The first layer 272 is plated in the aperture of a mask 264, for example in step 102 of the method 100. In the embodiment shown, the first layer 272 is $Ni_{35-40}$ $Fe_{65-60}$ and is plated on the $Ni_{55}Fe_{45}$ seed layer 262. After plating of the first layer 272, the plating bath and/or plating conditions are modified, for example using step 104 of the method 100. The plating current may be increased in a stepwise manner from a first current to a second current. The second layer 274 is then plated using the higher, second current, for example using step 106 of the method 100. In the embodiment shown, the second layer 274 is a high $B_{sat}$ layer and includes $Ni_{29}Fe_{71}$. Plating of the first layer 272 and of the second layer 274 may thus be performed in the same NiFe plating chemistry during the same plating run by introducing a single current step modulation. In addition, the first layer 272 has a less negative galvanic potential than the second layer 274, but a more negative galvanic potential than the seed layer 262. As a result, the risk of galvanic corrosion to the second layer 272 during fabrication of the transducer 260 may be reduced.

Thus, using the method 100, various embodiments of transducers 200, 200', 200", 200"', 220, 240, and 260 may be fabricated. Layers in these transducers 200, 200', 200", 200"', 220, 240, and 260, such as high $B_{sat}$ and/or high Fe content layers may be better protected from corrosion during fabrication. Thus, yield, performance, and reliability of the transducers 200, 200', 200", 200"', 220, 240, and 260 may be enhanced.

Figure 9:
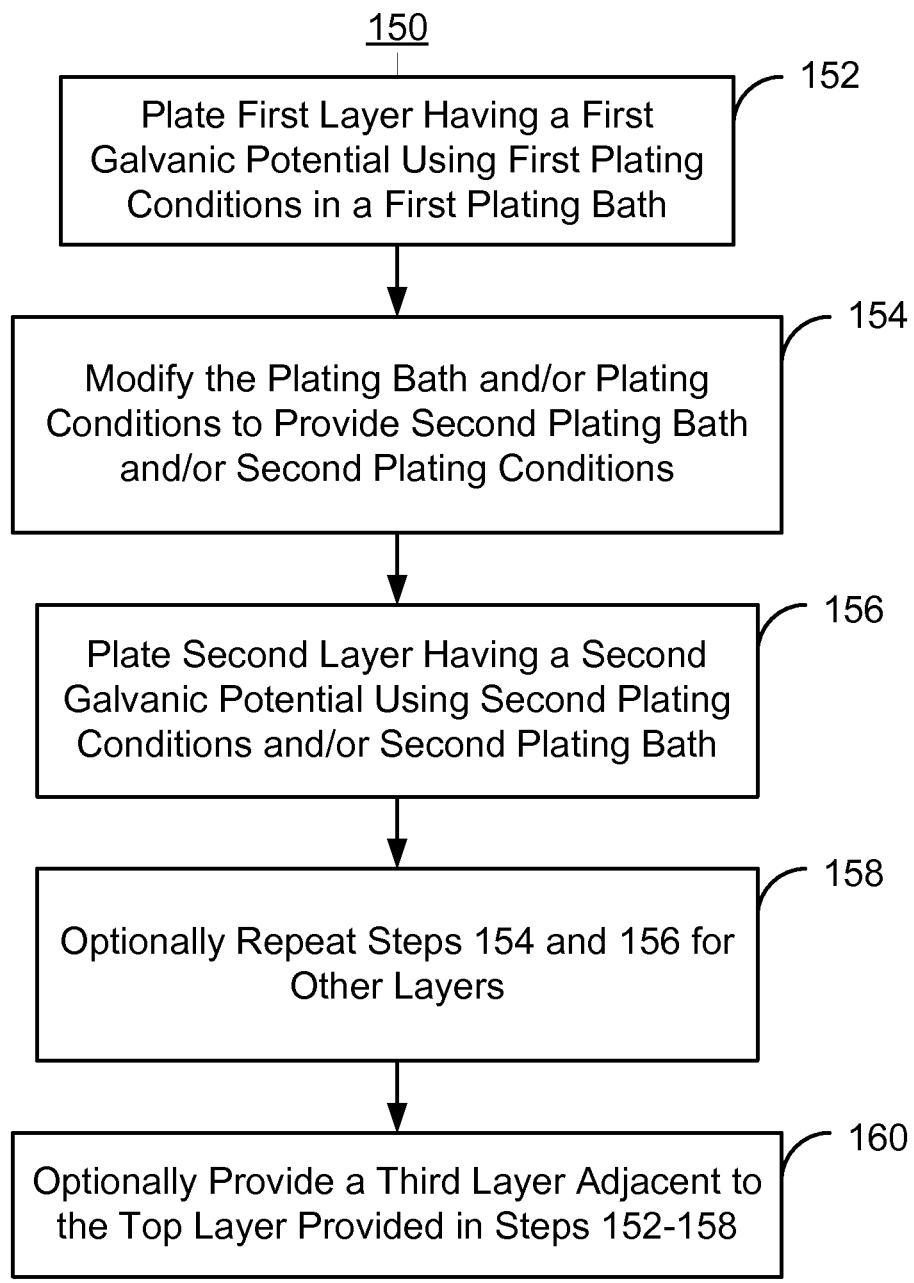
FIG. 9 is a flow chart depicting another exemplary embodiment of a method of forming a structure in a magnetic recording transducer.

FIG. 9 is a flow chart depicting another exemplary embodiment of a method 150 of forming a structure in a magnetic recording transducer. For simplicity, some steps may be omitted. The method 150 is described in the context of the transducers 200/200". However, the method 150 may be used for other transducers. The method 150 also may commence after formation of other structures of the read and/or write transducer. The method 150 is also described in the context of providing a single magnetic structure 210/210". However, the method 150 may be used to fabricate multiple structures at substantially the same time. The method 150 and structures such as the transducer 200/200' are also described in the context of particular layers. However, in some embodiments, such layers may include sub-layer(s).

A first layer 212/212" is plated, via step 152. Step 152 is analogous to step 102 of the method 100. The first layer 212/212" has a first galvanic potential that is based on the materials plated in step 152. At least one of the plating bath and the first plurality of plating conditions are modified, via step 154. Step 154 is analogous to step 104 of the method 100. In some embodiments, the plating current, electrolyte agitation, flow, temperature, concentration of constituents of the plating bath and/or the constituents of the plating bath may be changed. Thus, at least one of a modified plating bath and a second set of plating conditions are provided. A second layer 214/214" is plated, via step 156. The second layer is plated using the using at least one of the modified plating bath and the second plurality of plating conditions. Step 156 is analogous to step 106 of the method 100 and is also carried out without removing the device being fabricated from the plating bath. The second galvanic potential is, therefore, different from the first galvanic potential.

Steps 154 and 156 are optionally repeated to provide additional layers, via step 158. For example, the layer 218 may be fabricated in step 158. Additional layers may also be fabricated. The plating bath and/or plating conditions are modified in step 158 so that the galvanic potentials of the layers 212/212", 214/214", and 218 are monotonically more negative or monotonically less negative. Thus, the layers 212/212", 214/214", and 218 fabricated in steps 152, 156, and 158 have galvanic potentials that are monotonically more negative or monotonically less negative from top to bottom in the structure 210/210".

A third layer 216/216" may optionally be provided after the top layer, via step 160. If the third layer 216/216" is provided, it may be part of the transducer. Whether or not the third layer is part of the transducer, the galvanic potentials of the layers 212/212", 214/214", 218, and 216/216" are monotonically more negative or monotonically less negative from top to bottom in the structure 210/210". Layers, such as high $B_{sat}$ layers that are more likely to corrode may be better protected from corrosion during fabrication. Consequently, yield, performance and/or reliability of the transducer 210/210" may be improved.

Figure 10:
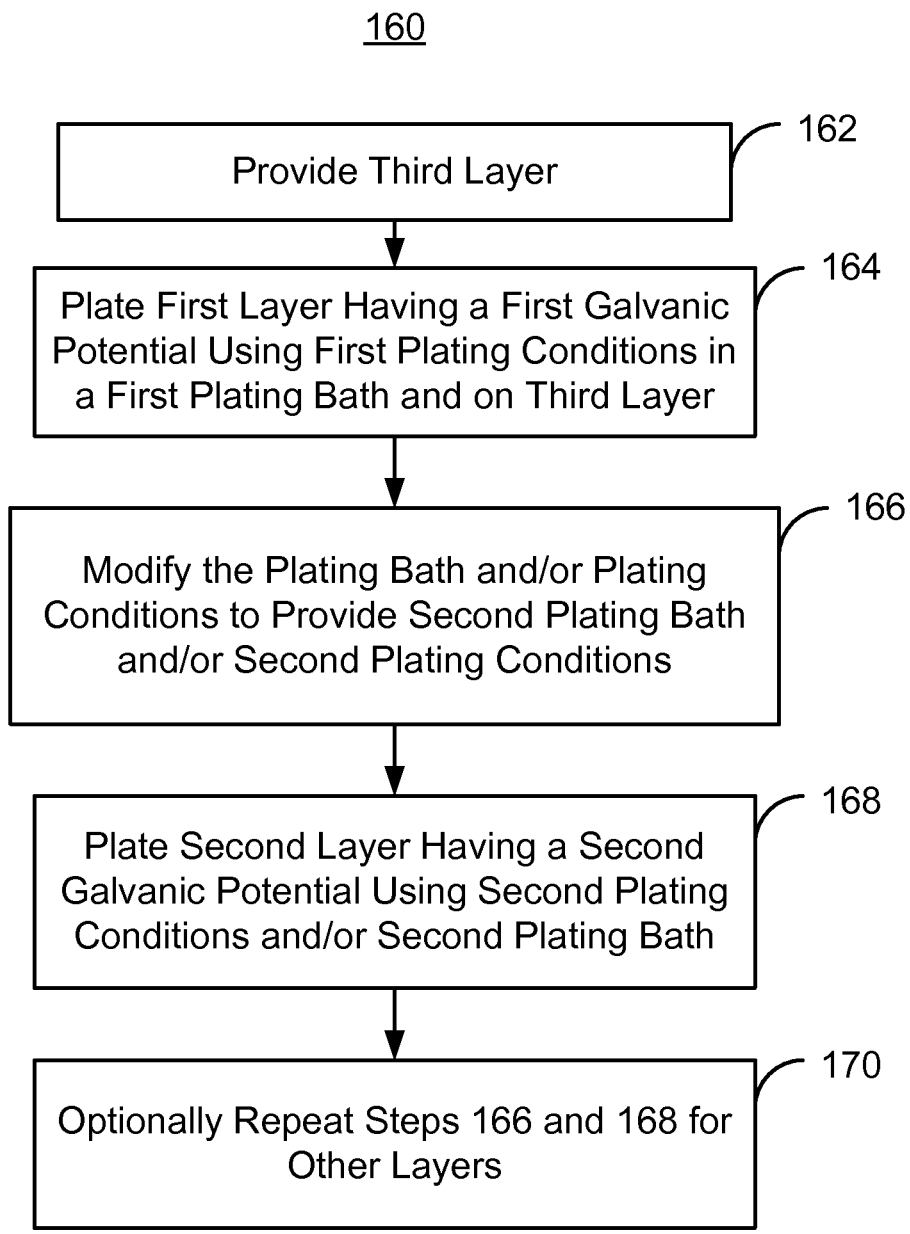
FIG. 10 is a flow chart depicting another exemplary embodiment of a method of forming a structure in a magnetic recording transducer.

FIG. 10 is a flow chart depicting another exemplary embodiment of a method 160 of forming a structure in a magnetic recording transducer. For simplicity, some steps may be omitted. The method 160 is described in the context of the transducers 200'/200'". However, the method 160 may be used for other transducers (not shown). The method 160 also may commence after formation of other structures of the read and/or write transducer. The method 160 is also described in the context of providing a single magnetic structure 210'/210'". However, the method 160 may be used to fabricate multiple structures at substantially the same time. The method 160 and structures such as the transducer 200'/200'" are also described in the context of particular layers. However, in some embodiments, such layers may include sub-layer(s).

A third layer 216'/216'" is provided, via step 162. Step 162 may include plating, sputtering, or otherwise depositing the third layer 216'/216". A first layer 212'/212'" is plated, via step 164. Step 164 is analogous to step 102 of the method 100. The first layer 212'/212'" has a first galvanic potential that is based on the materials plated in step 164. At least one of the plating bath and the first plurality of plating conditions are modified, via step 166. Step 166 is analogous to step 104 of the method 100. In some embodiments, the plating current, electrolyte agitation, flow, temperature, concentration of constituents of the plating bath and/or the constituents of the plating bath may be changed. Thus, at least one of a modified plating bath and a second set of plating conditions are provided. A second layer 214'/214'" is plated, via step 168. The second layer is plated using the using at least one of the modified plating bath and the second plurality of plating conditions. Step 168 is analogous to step 106 of the method 100 and is also carried out without removing the device being fabricated from the plating bath. The second galvanic potential is, therefore, different from the first galvanic potential.

Steps 166 and 168 are optionally repeated to provide additional layers, via step 170. For example, the layer 218' may be fabricated in step 158. Additional layers may also be fabricated. The plating bath and/or plating conditions are modified in step 170 so that the galvanic potentials of the layers 212'/212'", 214'/214'", and 218' are monotonically more negative or monotonically less negative. Thus, the layers 212'/212'", 214'/214'", and 218' fabricated in steps 164, 168, and 170 have galvanic potentials that are monotonically more negative or monotonically less negative from top to bottom in the structure 210'/210'". Layers, such as high $B_{sat}$ layers that are more likely to corrode, may thus be better protected from corrosion during fabrication. Consequently, yield, performance and/or reliability of the transducer 210/210" may be improved.

We claim:

1. A method for providing a structure in a magnetic recording transducer comprising:
    plating a first layer in a plating bath using a first plurality of plating conditions, the first layer having a first galvanic potential;
    modifying at least one of the plating bath and the first plurality of plating conditions to provide at least one of a modified plating bath and a second plurality of plating conditions;
    plating a second layer using the at least one of the modified plating bath and the second plurality of plating conditions so that either the first layer is between the second layer and a third layer such that the second layer does not directly contact the third layer or the second layer is between the first layer and the third layer such that the first layer does not directly contact the third layer, the at least one of the modified plating bath and the second plurality of plating conditions being selected such that the second layer has a second galvanic potential;
    wherein if the first layer is between the second layer and the third layer then the first galvanic potential is between the second galvanic potential and a third galvanic potential of the third layer such that the second layer is less likely to corrode than if the second layer directly contacted the third layer; and
    wherein if the second layer is between the first layer and the third layer then the second galvanic potential is between the first galvanic potential and the third galvanic potential of the third layer such that the first layer is less likely to corrode than if the first layer directly contacted the third layer;
    wherein the third layer is an ambient layer.

2. The method of claim 1 wherein the first layer is a $Ni_{1-x}Fe_x$ layer and the second layer is a $Ni_{1-y}Fe_y$ layer, where x is at least 0.5 and not more than 0.95 and y is at least 0.18 and not more than 0.75.

3. The method of claim 1 wherein the plurality of plating conditions include a plating current and wherein the step of modifying the at least one of the plating bath and the first plurality of plating conditions further includes:
    providing a step modulation change in the plating current.

* * * * *